US011294432B2

United States Patent
Rakshit (10) Patent No.: US 11,294,432 B2
(45) Date of Patent: Apr. 5, 2022

(54) DYNAMICALLY ALIGNING A DIGITAL DISPLAY

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/804,016

(22) Filed: Feb. 28, 2020

(65) Prior Publication Data

US 2021/0271293 A1 Sep. 2, 2021

(51) Int. Cl.
G09G 5/00 (2006.01)
G06F 1/16 (2006.01)
B25J 9/16 (2006.01)

(52) U.S. Cl.
CPC ............ G06F 1/1681 (2013.01); B25J 9/163 (2013.01); B25J 9/1664 (2013.01); G06F 1/1616 (2013.01)

(58) Field of Classification Search
CPC ...................................................... G06F 3/013
See application file for complete search history.

(56) References Cited

U.S. PATENT DOCUMENTS

| 2006/0119572 A1* | 6/2006 | Lanier | G06F 1/1605 |
| | | | 345/156 |
| 2015/0061999 A1* | 3/2015 | Kim | G06F 3/013 |
| | | | 345/156 |
| 2019/0018457 A1 | 1/2019 | Kim | |

FOREIGN PATENT DOCUMENTS

WO 2017094936 A1 6/2017

OTHER PUBLICATIONS

"Google's smartwatch with radar for gesture control—YouTube", May 20, 2016, 2 pages, <https://www.youtube.com/watch?v=jWNebDDmuXc>.
Fuchs et al., "FoldWatch: Using Origami-Inspired Paper Prototypes to Explore the Extension of Output Space in Smartwatches", NordiCHI'18, Sep. 29-Oct. 3, 2018, Oslo, Norway, Copyright © 2018, ACM ISBN/978-1-4503-6437-9/18/09, 13 pages.
Wenig et al., "WatchThru: Expanding Smartwatch Displays with Mid-air Visuals and Wrist-worn Augmented Reality", Smartwatch Interactions and Displays, CHI 2017, May 6-11, 2017, Denver, CO USA, ACM ISBN 978-1-4503-4655-9/17/05, 6 pages.

* cited by examiner

Primary Examiner — Nan-Ying Yang
(74) Attorney, Agent, or Firm — Joseph P. Curcuru (57) ABSTRACT

Embodiments describe an approach for dynamically aligning the computing device's display area with a user's visual focus by analyzing a direction of a display area and a user's visual focus, wherein the display area comprises a target area. Responsive to receiving one or more notifications or a voice command from a user, embodiments describe determining the target area is not aligned with the user's visual focus. Additionally, embodiments describe activating a robotic assembly to align the target area with the user's visual focus, and aligning the target area with the user's visual focus based on a user's current situation, wherein aligning causes the target area and a user's line of visual focus to overlap within a predetermined angular range.

20 Claims, 8 Drawing Sheets

DYNAMICALLY ALIGNING A DIGITAL DISPLAY

BACKGROUND

The present invention relates generally to the field of digital display, and more particularly to dynamically aligning the position of a digital display screen with a target.

A smartwatch is a wearable computer in the form of a wristwatch. Generally, modern smartwatches provide a local touchscreen interface for daily use, while an associated smartphone app provides for management and telemetry, such as long-term biomonitoring. While early models could perform basic tasks, such as calculations, digital time telling, translations, and game-playing, more advanced smartwatches have more general functionality like smartphones, including mobile apps, a mobile operating system, and wireless connectivity. Some smartwatches function as portable media players, with FM radio and playback of digital audio and video files via an audio or visual headset. Some models, called "watch phones" or "phone watches," have mobile cellular functionality for making phone calls. While internal hardware varies, most smartwatches have an electronic visual display, either backlit liquid crystal display (LCD) or organic light-emitting diode (OLED).

Smartwatches are generally powered by a rechargeable lithium-ion battery. Peripheral devices operating on or by a smartwatch may include digital cameras, thermometers, accelerometers, pedometers, heart rate, monitors, altimeters, barometers, compasses, GPS receivers, speakers, and storage devices (e.g., memory cards). Software run by a smartwatch may include digital maps, schedulers, personal organizers, calculators, and various kinds of watch faces. The smartwatch may communicate with external devices such as sensors, wireless headsets, or a heads-up display. Like other computers, a smartwatch may collect information from internal or external sensors, and it may control, or retrieve data from, other instruments or computers. Smartwatches may support wireless technologies known in the art. For many purposes, a "watch computer" such as a smartwatch serves as a front end for a remote system such as a smartphone, communicating with the smartphone using various wireless technologies. Smartwatches are advancing, especially their design, battery capacity, and health-related applications.

SUMMARY

Embodiments of the present invention disclose a method, a computer program product, and a system for dynamically aligning the computing device's display area with a user's visual focus, the embodiments comprise: analyzing a direction of a display area and a user's visual focus, wherein the display area comprises a target area; responsive to receiving one or more notifications or a voice command from a user, determining the target area is not aligned with the user's visual focus; activating a robotic assembly to align the target area with the user's visual focus; and aligning the target area with the user's visual focus based on a user's current situation, wherein aligning causes the target area and a user's line of visual focus to overlap within a predetermined angular range.

DETAILED DESCRIPTION

Generally, a wearable internet of things (IoT) device, such as a smartwatch, is fixed to a supportive strap designed to lay flush against a user's skin much like a standard watch. Additionally, the direction of the display area of the smartwatch (i.e., display area) is also fixed based on how the user wears the smartwatch. Inadvertently, the camera, speakers, and/or microphone attached to the smartwatch are also fixed and are positioned based on how the user wears the smartwatch. Generally, a user may be able to rotate their wrist to view the display area, or rotate and/or reposition the user's own eye focus, eye direction (e.g., line of sight), and/or tilt their head to view the display area or bring the smartwatch into position to listen to projected audio. However, there are instance where the user is physically unable to rotate the smartwatch, or the user is unable to adjust a viewing angle to clearly view the display area. Embodiments of the present invention solve this problem by enabling the smartwatch and/or display area to automatically align with the user's visual focus (i.e., eye focus and/or eye direction) based on a set of conditions corresponding to a user's current state (i.e., current user conditions). Current user conditions are conditions that the user is experiencing including, but not limited to: weather, body position, activity, biometric data, emotional state, and/or surrounding area. For example, if it is raining and the user is holding a package in the left hand, the user's current condition would be in the rain holding an object in the left hand, wherein the user's wrist and smartwatch are obstructed by the package.

Embodiments of the present invention enable a smartwatch to contain and operate one or more collapsible/foldable robotic assemblies that are attached to the display area physically separable from the body of the smartwatch. Various embodiments of the present invention can automatically unfold and/or fold/collapse a robotic assembly (i.e., robotic assembly 116) based on current user conditions, and accordingly the display area can automatically align towards a target direction (for example, the user's visual focus). In various embodiments, the collapsible robotic assembly can be battery operated. Embodiments of the present invention enable the direction of a camera and/or a microphone installed on the smartwatch to auto-rotate towards the target direction based on current user conditions. Embodiments of the present invention can use the orientation of the camera and/or the microphone to confirm that the display area axis of the smartwatch is aligned with the user's line of visual focus within a predetermined angular range. For example, embodiments of the present invention confirm that the display area is aligned with a user's visual focus when the user's line of visual focus overlaps a perpendicular axis of the camera component on the smartwatch where the camera is the display area, wherein the display area is the target area. The target area and display area can be predetermined.

Embodiments of the present invention enable a robotic assembly attached to the display area to confidently identify any content and/or people present in the surrounding vicinity, and accordingly automatically align the display area with the user's visual focus in such a way that the display area is only visible to the user such that the content of the smartwatch is only visible to the user. Embodiments of the present invention can automatically align an axis of the display area with a user's line of visual focus by extending, rotating, and/or shaping one or more robotic assemblies until the axis of display area is aligned with the user's line of visual focus and/or is only visible to the user.

Embodiments of the present invention can determine how one or more robotic assemblies can be manipulated so that the display area of the smartwatch and/or other functionalities of the smartwatch can align to the user's line of visual focus based on received voice commands, sensor feed analysis, user mobility pattern, and/or other user-activated sensors known in the art and current user conditions. Embodiments of the present invention can receive identified user needs associated with the display area alignment, the user's wrist and/or body movement information from the smartwatch (i.e., user data). Embodiments of the present invention can instruct one or more robotic assemblies to adjust the display area based on the received user data from the smartwatch. Embodiments of the present invention can enable one or more robotic assemblies to sync with a user's movement, so the display area is consistently in the user's line of visual focus, which enables the target area to be captured properly with minimal misalignment. The target area, can be predetermined, and is the area on the smartwatch that must align with the user's line of visual focus (e.g., the camera, the display screen, and/or any other piece of the smartwatch). Embodiments of the present invention can track and monitor the user's line of visual focus through the video feed captured by a camera equipped on or within the smartwatch.

Embodiments of the present invention can utilize force-based feedback administered to one or more robotic assemblies and/or to the display area, wherein embodiments of the present invention self-learn user preferences based on the received force-based feedback. The self-learned user preferences applies to the folding and unfolding of one or more robotic assemblies and the positioning of the display area. For example, while a robotic assembly is unfolding and extending out of the smartwatch structure the robotic assembly tilts and rotates the display area to alter the position of the display area. In this example, as the robotic assembly unfolds and extends out, the user can apply force-based feedback on the smartwatch display area to adjust or stop the robotic assembly from unfolding and/or extending and accordingly the robotic assembly can automatically adjust the direction of the display area based on the received force-based feedback. In this example, embodiments of the present invention can learn a user's habits from the force-based feedback, wherein embodiments of the present invention can create and store learned user preferences associated with the received force-based feedback. In another example, the robotic assembly can receive force-based feedback from another person and/or object surrounding the user, such as a wall, a window, a pole, another person's arm, and/or any other object and/or person known in the art.

Embodiments of the present invention can continuously monitor and analyze the user's surrounding area to identify the user's current conditions. Embodiments of the present invention can identify obstructions between the user's visual focus and the display area. If embodiments of the present invention determine there is an obstruction between the user's visual focus and the display area then embodiments of the present invention can activate and extend one or more robotic assemblies to align the display area with the user's line of visual focus. Embodiments of the present invention can use the continually monitored and analyzed surrounding area to identify potential danger that can cause damage to the display area and/or robotic assembly. If embodiments of the present invention identify potential danger and/or damage to the display area and/or robotic assembly then embodiments of the present invention can stop or pause the expansion of one or more robotic assemblies until the potential threat is removed and one or more robotic assemblies and display area are clear to operate. In some embodiments, the one or more robotic assemblies can collapse back into the smartwatch if embodiments of the present invention identify a potential danger and/or damage to the display area and/or robotic assembly.

It should be noted herein that in the described embodiments, participating parties have consented to having their images captured, uploaded and saved and their activity recorded and monitored. Participating parties are aware of the potential that such recording and monitoring may be taking place. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the FIGS. (i.e., FIG. 1-FIG. 8).

Figure 1:
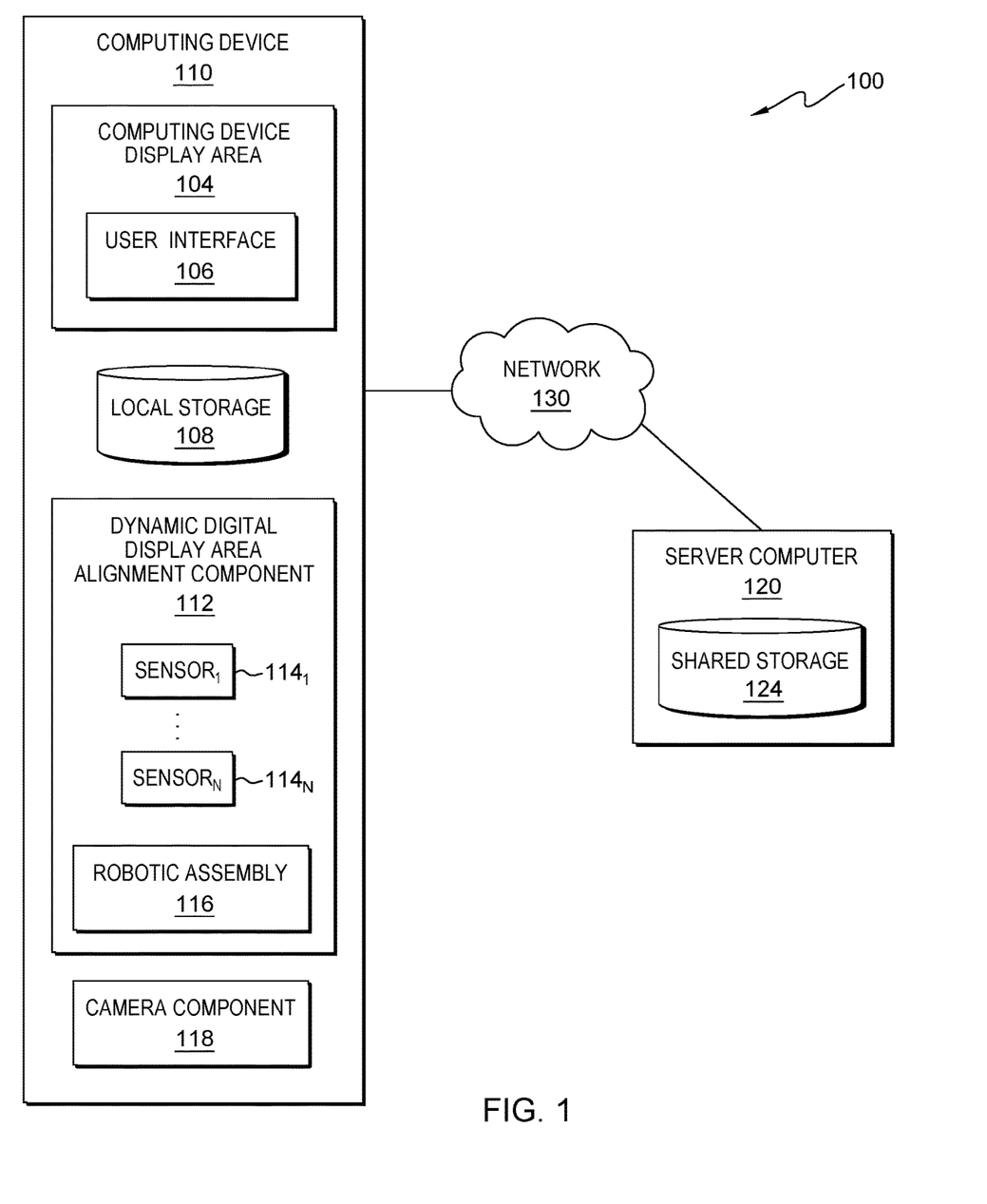
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, smart lens 140, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that can support communications between computing device 110 and server computer 120, and any other computing devices and/or storage devices (not shown in FIG. 1) within distributed data processing environment 100.

In some embodiments of the present invention, computing device 110 can be, but is not limited to, a standalone device, a client server, a laptop computer, a tablet computer, a netbook computer, a personal computer (PC), a smartphone, a desktop computer, a smart television, a smartwatch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of computing device display area (display area) 104, local storage 108, dynamic digital display area alignment component (alignment component) 112, sensor 114$_{1-N}$, camera component (camera) 118, and/or robotic assembly 116. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 8.

In the depicted embodiment, display area 104 includes user interface (interface) 106. In various embodiments of the present invention, display area 104 can include interface 106, a bevel, a crown, camera 118, a display screen, and/or any components of the face of a watch, a smartwatch, and/or a computing device known in the art. Interface 106 can provide an interface to computing device 110 and/or alignment component 112 on computing device 110. Computing device 110, via interface 106, can enable a user and/or a client to interact with alignment component 112 and/or server computer 120 in various ways, such as sending program instructions, receiving program instructions, sending and/or receiving messages, updating data, sending data, inputting data, editing data, collecting data, and/or receiving data. In various embodiments of the present invention, display area 104 comprises the target area.

In one embodiment, interface 106 can be a graphical user interface (GUI) or a web user interface (WUI) and can display at least text, documents, web browser windows, user options, application interfaces (e.g., application user interfaces (UI)), and instructions for operation. Interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data, collect data and/or receive data. In various embodiments of the present invention, display area 104 can include internal and external hardware components, as depicted, and described in further detail with respect to FIG. 8.

Camera component (camera) 118 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, and/or any other camera known in the art.

Robotic assembly 116 can be any robotic assembly known in the art. In various embodiments of the present invention, robotic assembly 116 can be folded inside computing device 110, wherein one end of robotic assembly 116 is attached to display area 104 and another end is attached to computing device 110. In various embodiments of the present invention, robotic assembly 116 can have a plurality of arms and a plurality of hinges, so that robotic assembly can achieve 6 degrees of freedom. In one example, robotic assembly 116 can be fixed at the dial area and/or crown area of a smartwatch. In some embodiments, robotic assembly 116 can be connected to an electric motor. Robotic assembly 116 can comprise robotic components, wherein robotic components are any robotic components known in the art. In various embodiments of the present invention, robotic assembly 116 can be a motor operating on or within computing device 110 that can be executed by alignment component 112 to adjust and align display area 104 with a user's visual focus.

Figure 2A:
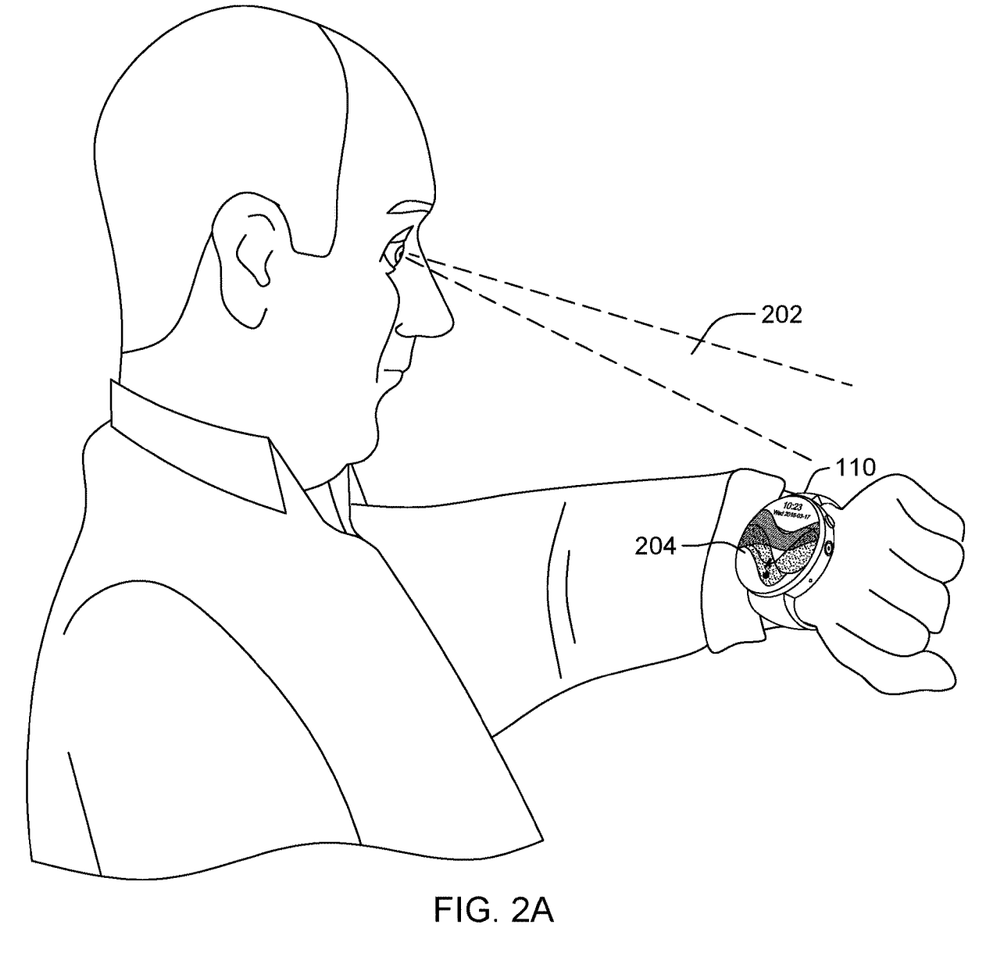
FIG. 2A is an example of the dynamic digital display area alignment component identifying a user's visual focus within the distributed data processing environment of FIG. 1.
Figure 2B:
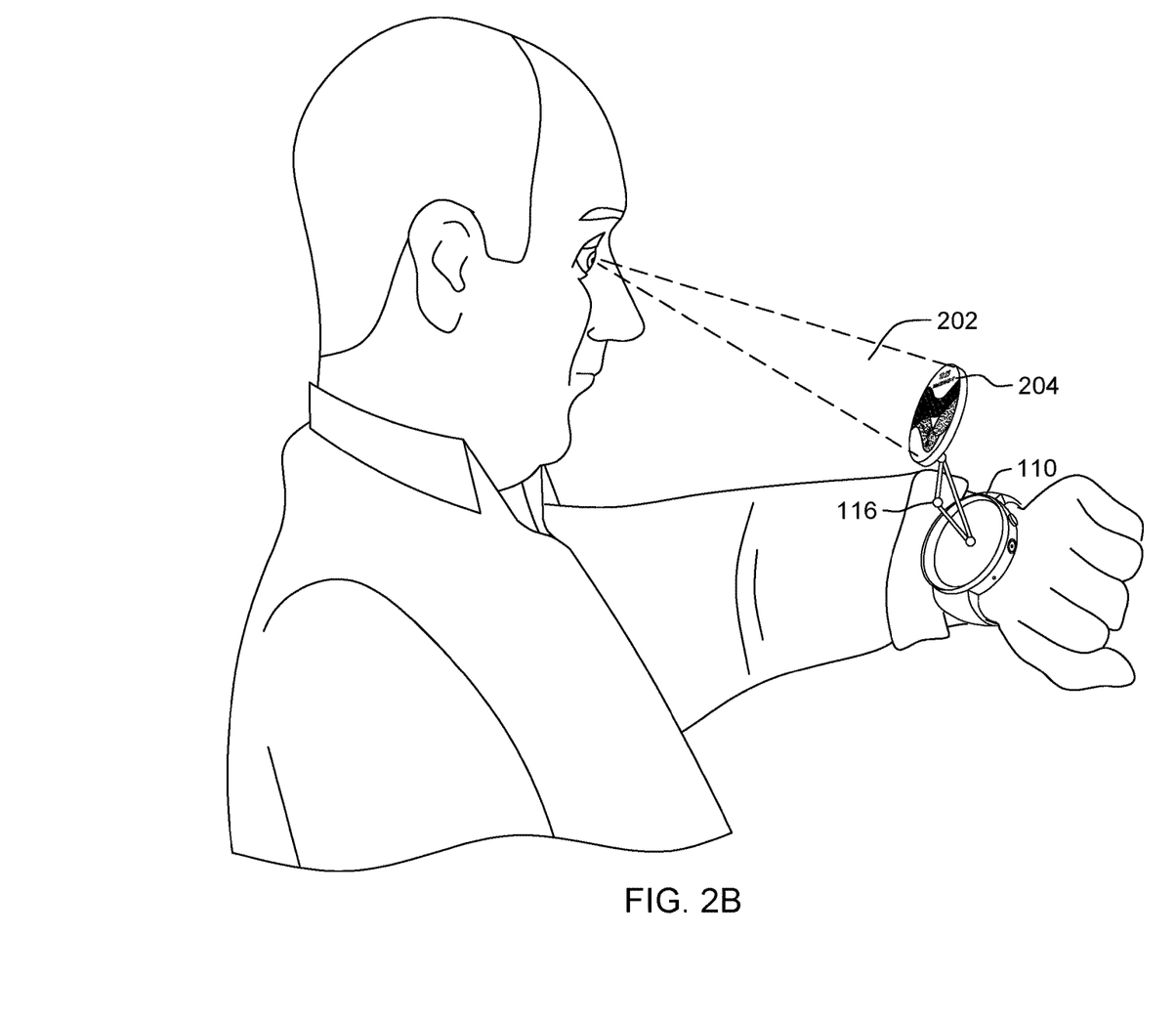
FIG. 2B is an example of the dynamic digital display area alignment component activating the robotic assembly on a computing device within the distributed data processing environment of FIG. 1.

In various embodiments of the present invention, robotic assembly 116 can be connected to display area 104. In various embodiments of the present invention, robotic assembly 116 can have concentric hydraulic calendar-based arms, so the arm length of robotic assembly 116 can be adjusted. In one particular embodiment, the dimension of robotic assembly 116 can be such that it can be folded and kept within the space available within the smartwatch dial, as shown in FIG. 2A and FIG. 2B. In FIG. 2A, computing device 110 is a wearable smartwatch and display area 104 is the smartwatch display screen that comprises a digital camera. In FIG. 2B, robotic assembly 116 expands and unfolds from the smartwatch structure and extends the smartwatch display screen out and away from the smartwatch. In various embodiments of the present invention, not depicted in FIG. 2, robotic assembly 116 can be positioned, connected, and/or stored within the wrist belt of computing device 110. In various embodiments of the present invention, not depicted in FIG. 2, robotic assembly 116 and computing device 110 do not depict the wiring or internal and external hardware components.

In various embodiments of the present invention, the computing and electric circuit can also be adjusted within the wrist belt, dial area, and/or anything similar in the art. In various embodiments of the present invention, when robotic assembly 116 is folded, then display area 104 can be adjusted with the dial of the smartwatch. In example of the present invention, when robotic assembly 116 is unfolded or un-collapsed (i.e., folded and extended), then the display and crown area of display area 104 can be detached from the smartwatch frame and can be lifted by with the movement of robotic assembly 116.

In various embodiments of the present invention, the 6 degrees of freedom in robotic assembly 116 enables display area 104 to be positioned in any direction known in the art. In various embodiments of the present invention, the smartwatch can have various sensors, such as movement detection sensors, voice direction sensors, camera system sensors, and/or any other sensors known in the art. In various embodiments of the present invention, alignment component 112 uses context detection (i.e., current user condition detection), direction of sound detection, and facial direction detection to identify how display area 104 should be adjusted. In various embodiments of the present invention, alignment component 112 can receive analysis of the user's voice command and the current user conditions from the smartwatch and accordingly analyze the direction of display area 104 in order to determine if and how display area 104 should be positioned.

A sensor is a device that detects or measures a physical property and then records or otherwise responds to that property, such as vibration, chemicals, radio frequencies, environment, weather, humidity, light, etc. Sensor $114_{1-N}$, herein sensor(s) 114, detect a plurality of attributes of a user of alignment component 112 and of the environment of the user. The detected plurality of attributes can be analyzed to determine the user's current conditions. As used herein, N represents a positive integer, and accordingly the number of scenarios implemented in a given embodiment of the present invention is not limited to those depicted in FIG. 1.

In some embodiments, sensor(s) 114 include any device capable of imaging a portion of the electromagnetic spectrum. In various embodiments of the present invention, computing device 110 is a wearable device that comprises sensor(s) 114, wherein sensor(s) 114 include sensors for tracking and monitoring eye-focus and/or eye movement. Computing device 110 can comprise biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography data, body temperature, eye tracking data, and/or any other biometric sensor known in the art. Sensor(s) 114 may be one or more of a plurality of types of microphone for detecting speech and other audible sounds, such as a phone ringing. Sensor(s) 114 may be one or more of a plurality of types of gyroscopic sensors that can detect movement. Sensor(s) 114 may be one or more of a plurality of types of pressure sensors. Sensor(s) 114 may be able to detect weather conditions, such as air temperature, relative humidity, presence and type of precipitation, wind speed, etc., as user preferences may depend on the weather conditions. Sensor(s) 114 may be global positioning system (GPS) sensors. Sensor(s) enable the collection of user data that can be retrieved by alignment component 112. User data can be any type biometric data known in the art and/or current user activity.

Smart lens 140 can be any form of wearable smart contact lens, smart glasses, or any form of smart eyewear or headwear known in the art that contains a lens. In the depicted embodiment, Smart lens 140 includes tracker component (tracker) 144. In various embodiments, not depicted in FIG. 1, smart lens 140 can comprises of one or more camera components. Alternatively, a smart lens comprises augmented reality capabilities, via an augmented reality component, as it is known in the art. Smart lens 140 can be paired and communicate with computing device 110, in which computing device 110 can communicate with a transaction system for executing a transaction. Tracker 144 can be a gaze point tracker that can identify the eye focus of the user along with peripheral vision, or focus angle, of the user. In various embodiments, smart lens 140 can comprise an internal compass to identify the direction of focus of the user.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers and application server computers) that act as a single pool of seamless resources when accessed within distributed data processing environment 100. Server computer 120 can include internal and external hardware components, as depicted, and described in further detail with respect to FIG. 8.

The present invention may contain various accessible data sources, such as local storage 108 and/or shared storage 124, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Alignment component 112 enable the authorized and secure processing of personal data.

Each of shared storage 124 and local storage 104 can be a data/knowledge repository and/or a database that can be written and/or read by one or a combination of alignment component 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house capture user activity, selected videos, and/or data shared throughout distributed data processing environment 100.

In the depicted embodiment, alignment component 112 executes on computing device 110. In other embodiments, not depicted in FIG. 1, alignment component 112 can execute anywhere in distributed data processing environment 100 as long as alignment component 112 can communicate with computing device 110 and/or server computer 120 via network 130. In various embodiments of the present invention, alignment component 112 communicates with computing device 110, robotic assembly 116, smart lens 140 and/or server computer 120.

In various embodiments of the present invention, computing device 110 can comprise an electric motor, utilized by alignment component 112 to autorotate display area 104 (i.e., the target area), wherein the electric motor can be mounted on a gear. In this particular embodiment of the present invention, when the motor rotates, the gear rotates display area 104 (e.g., the crown of the smartwatch). In various embodiments of the present invention, alignment component 112 can enable autorotation of display area 104 by instructing the motor to rotate the gear and/or display area 104. In various embodiments of the present invention, display area 104 (e.g., the dial-area of the smartwatch) can comprise a hydraulic co-centric calendar based robotic assembly (i.e., robotic assembly 116).

In various embodiments of the present invention, alignment component 112 can activate robotic assembly 116, and instruct the robotic system to move/adjust display area 104 so display area 104 is aligned with the target direction (i.e., user's visual focus). In various embodiments, alignment component 112 enables robotic assembly 116 to move display area 104 based on the received user voice command(s) and/or the current user conditions. In various embodiments of the present invention, alignment component 112 instructs robotic assembly 116 to adjust display area 104 until the target area overlaps with the user's visual focus. In various embodiments of the present invention, when the target area overlaps with the user's visual focus within a predetermined angle then alignment component 116 determines display area 104 is aligned with the user's visual focus and will stop adjusting display area 104.

In various embodiments of the present invention, sensor(s) 114 can identify the direction display area 104 needs to be adjusted based on the user's visual focus, voice command, and/or current situation, in which alignment component 112 can instruct robotic assembly 116 to gradually adjust display area 104 by extending, folding, unfolding, rotating, and/or tilting the robotic components of robotic assembly 116 and/or display area 104.

In various embodiments of the present invention, a user can provide manual force-based feedback to display area 104 to correct the direction of movement (e.g., folding, unfolding, tilting, rotating, etc.) of robotic assembly 116. In some embodiments of the present invention, computing device 110 can self-learn. In various embodiments of the present invention, computing device 110 can track a user's movement and the user's visual focus. In various embodiments of the present invention, alignment component 112 can analyze the position of the target area and/or display area 104 and determine when display area 104 needs to be auto-adjusted to overlap with the user's visual focus.

In various embodiments of the present invention, alignment component 112 can enable a smartwatch to contain and execute one or more collapsible/foldable robotic assemblies (i.e., robotic assembly 116) that are coupled to display area 104 and computing device 110. In various embodiments of the present invention, alignment component 112 can instruct robotic assembly 116 to unfold and/or fold/collapse based on current user conditions. In various embodiments of the present invention, alignment component 112 can instruct the robotic assembly to automatically align display area 104 towards the target direction (i.e., the user's visual focus). In various embodiments of the present invention, alignment component 112 can enable the direction of camera 118 and/or microphone of a smartwatch to auto-rotate towards the user's visual focus based on current user conditions, user preferences, and/or a received command or notification.

In various embodiments of the present invention, alignment component 112 can use the rotation direction of camera 118 and microphone to can confirm that display area 104 is aligned with the user's visual focus within a predetermined range. For example, alignment component 112 confirms that display area 104 is aligned with a user's visual focus when the users visual focus overlaps with the camera 118 on the smartwatch (i.e., target area). In various embodiments of the present invention, alignment component 112 can track a user's visual focus using a camera housed on computing device 110 (e.g., camera 118).

For example, as shown in FIG. 2A, alignment component 112 is given a predetermined rule establishing that target area must overlap with the user's focus angle when the user's smartwatch receives a notification or is given a voice command. In this example, alignment component 112 receives a notification and identifies that the user's focus angle (focus angle) 202 is predefined as 5 degrees in the user's peripheral vision by a pre-established rule. In this particular example, alignment component 112 identifies, using sensor(s) 114 and camera 118 on the smartwatch (i.e., computing device 110), that focus angle 202 is not overlapping with target area 204 and will need to activate robotic assembly 116 based on the predetermined rules.

For example, as shown in FIG. 2B, comprising the same predetermined and pre-established rules as FIG. 2A, alignment component 112 activates robotic assembly 116 on the smartwatch (i.e., computing device 110) to adjust target area 204 so target area 204 overlaps with focus angle 202. In this example, alignment component 112 adjusts target area 204 until sensor(s) 114 and camera 118 determine and notify alignment component 112 that target area 204 is overlapping with focus angle 202. In this example, when sensor(s) 114 notify alignment component 112 that target area 204 is overlapping with focus angle 202 then alignment component 112 instructs robotic assembly 116 to stop and hold the current position.

In various embodiments of the present invention, alignment component 112 can confirm that the target area is aligned with a user's visual focus by communicating with one or more smart contact lenses (i.e., smart lens 140) worn by the user. For example, a user can establish user preferences that instruct alignment component 112 to automatically align display area 104 with the user's visual focus, via smart lens 140, when the user receives a notification. In this example, alignment component 112 constantly tracks and communicates with the smart lens 140 and when the user receives a notification alignment component 112 automatically activates robotic assembly 116 and maneuvers the components of robotic assembly 116 to align display area 104 with the smart lens 140. In this example, alignment component 112 utilizes video feed from the camera 118 and the camera component on smart lens 140 to identify obstructions or potential hazards for robotic assembly 116. In this example, alignment component 112 confirms alignment between display area 104 and the user's visual focus when alignment component 112 and the visual focus measured by the smart lens 140 overlap within a predetermined range. In this particular embodiment, the smart lens 140 can notify alignment component 112 that alignment has been achieved.

In various embodiments of the present invention, alignment component 112 can enable a robotic assembly attached to display area 104 to confidently identify any content and/or people present in the surrounding vicinity, and accordingly automatically align display area 104 with the user's visual focus in such a way that display area 104 is only visible to the user (i.e., the content of the smartwatch is only visible to the user). In various embodiments of the present invention, alignment component 112 can use a live video feed or images from the camera 118 and/or one or more smart lens 140, and data received from sensor(s) 114 to determine a user's surrounds and/or the current user conditions. In various embodiments of the present invention, alignment component 112 can automatically align display area 104 with the user's visual focus by extending, rotating, and/or shaping one or more robotic assembly until display area 104 is aligned with the user's visual focus and/or is only visible to the user.

In various embodiments of the present invention, alignment component 112 can identify how one or more robotic assemblies can be unfolded so that display area and/or other functionalities can be auto-aligning based on received voice commands, sensor feed analysis, user mobility pattern, other user activated sensors known in the art and current user conditions. In various embodiments of the present invention, alignment component 112 can receive identified user needs associated with display area 104 alignment from user data (e.g., the user's wrist and/or body movement) captured by sensor(s) 114. In various embodiments of the present invention, alignment component 112 can can instruct one or more robotic assemblies to adjust display area 104 based on the received user data from the smartwatch. In various embodiments of the present invention, alignment component 112 can enable one or more robotic assemblies to sync with a user's movement, so display area 104 is consistently in the user's visual focus, which enables the target area to be captured properly with minimal misalignment. The target area is the area on the smartwatch that must align with the user's visual focus (e.g., camera 118, the display screen, and/or any other piece of the smartwatch). In various embodiments of the present invention, alignment component 112 can track and monitor the user's visual focus through the video feed captured by camera 118 on or within the smartwatch.

In various embodiments of the present invention, alignment component 112 can utilize force-based feedback administered to one or more robotic assemblies and/or to the display area, wherein embodiments of the present invention self-learn user preferences based on the received force-based feedback. The self-learned user preferences can be applied to the folding and unfolding of one or more robotic assemblies and the positioning of the display area. For example, while a robotic assembly is unfolding and extending out of the smartwatch structure the robotic assembly tilts and rotates display area 104 to alter the direction of the display area. In this example, as the robotic assembly unfolds and extends out, the user can apply force-based feedback on the smartwatch display area to adjust or stop the robotic assembly from unfolding and/or extending and accordingly the robotic assembly can automatically adjust the direction of display area 104 based on the received force-based feedback. In this example, alignment component 112 learns a user's habits from the force-based feedback, wherein alignment component 112 can create and store learned user preferences associated with the received force-based feedback. In another example, the robotic assembly can receive force-based feedback from another person and/or object surround the user, such as a wall, a window, a pole, another person's arm, and/or any other object and/or person known in the art.

In various embodiments of the present invention, alignment component 112 can continuously monitor and analyze the user's surrounding area to identify the user's current conditions. In various embodiments of the present invention, alignment component 112 can identify obstructions between the user's visual focus and the display area. If embodiments of the present invention determine there is an obstruction between the user's visual focus and display area 104 then alignment component 112 can activate and extend one or more robotic assemblies to align display area 104 with the user's visual focus. In various embodiments of the present invention, alignment component 112 can use the continually monitored and analyzed surrounding area to identify any potential danger that can cause damage to display area 104 and/or robotic assembly. If embodiments of the present invention identify any potential danger and/or damage to display area 104 and/or robotic assembly then alignment component 112 can stop or pause the expansion of one or more robotic assemblies until the potential threat is removed and one or more robotic assemblies and display area are clear. In some embodiments, the one or more robotic assemblies can collapse back into the smartwatch if embodiments of the present invention identify any potential danger and/or damage to display area 104 and/or robotic assembly.

Figure 3:
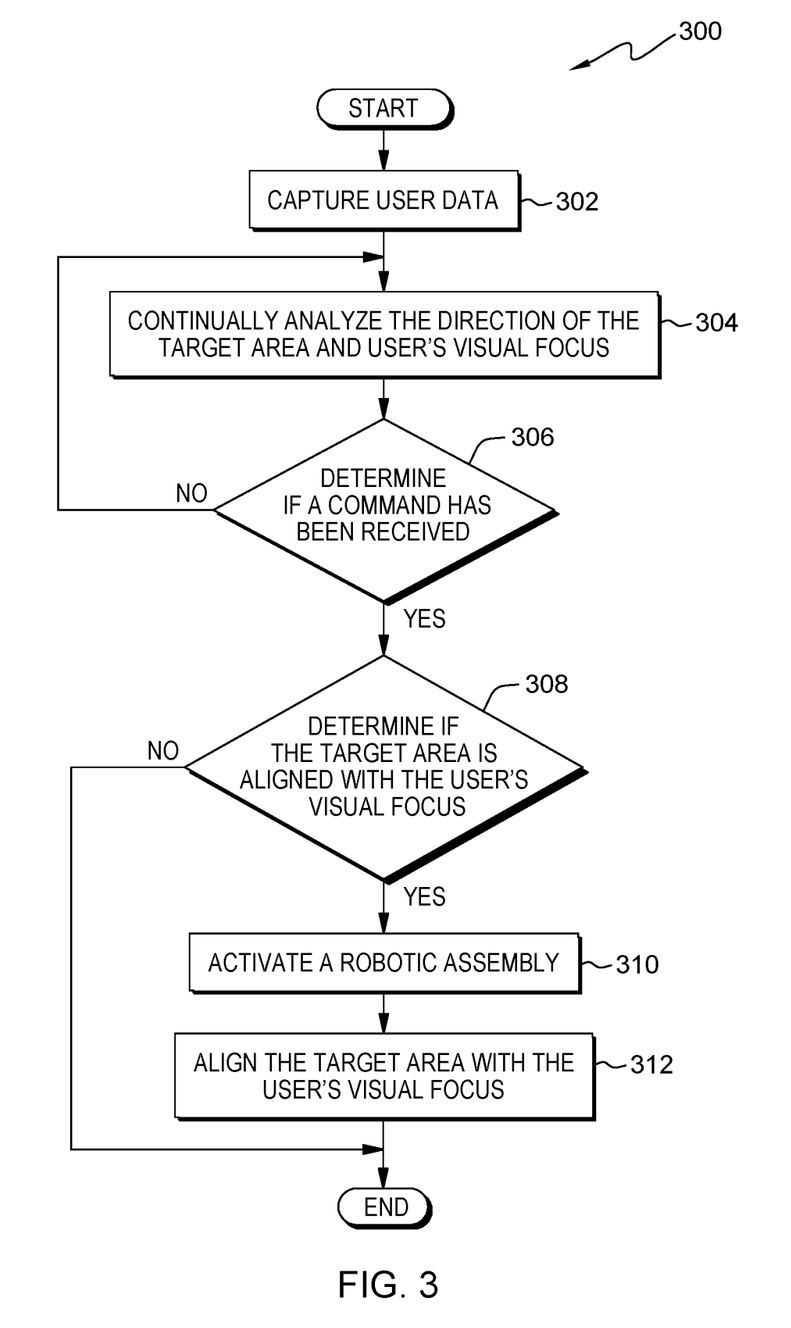
FIG. 3 illustrates operational steps of the dynamic digital display area alignment component, on the computing device within the distributed data processing environment of FIG. 1, for dynamically aligning the computing device's display area, in accordance with an embodiment of the present invention.

FIG. 3 illustrates operational steps of alignment component 112, generally designated 300, in communication with computing device 110, within distributed data processing environment 100 of FIG. 1, for dynamically aligning the computing device's display area. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

In step 302, alignment component 112 captures user data. In various embodiments of the present invention, alignment component 112 can capture and/or receive user data via sensor(s) 114. The captured user data enables alignment component 112 to identify a user's current condition (i.e., current user conditions) and/or user data.

In step 304, alignment component 112 continually analyzes the direction of the target area and the user's visual focus. In various embodiments of the present invention, alignment component 112 can continually analyze and track the target area and the user's visual focus by utilizing camera 118, one or more smart lens 140es, and/or sensor(s) 114.

In step 306, alignment component 112 determines if a command and/or notification is received. In various embodiments of the present invention, computing device 110 can determine if a notification and/or a command (e.g., voice command) is received. In the depicted embodiments, if alignment component 112 determines that a notification and/or a command is received (Yes step) then alignment component 112 can alert the user and/or determine if the target area is aligned with the user's visual focus, in which alignment component 112 can triggers the alignment between the display area and the user's visual focus. In the depicted embodiment, if alignment component 112 determines no command and/or notification is received then alignment component 112 can continually analyze and track the target area and the user's visual focus.

In step 308, alignment component 112 determines if the target area is aligned with the user's visual focus. In various embodiments of the present invention, alignment component 112 can determine if the target area (e.g., display area 104) is aligned with the user's visual focus. In the depicted embodiment, if alignment component 112 determines the target area is aligned with the user's visual focus (Yes step) then the process can end. In the depicted embodiment, if alignment component 112 determines the target area is not aligned with the user's visual focus (No step) then alignment component 112 can activate robotic assembly 116 to try and align the target area with the user's visual focus. In various embodiments of the present invention, alignment component 112 can determine that the target area is not aligned with the user's visual focus when the user's visual focus does not overlap with the target area within a predetermined range.

In step 310, alignment component 112 actives robotic assembly 116. In various embodiments of the present invention, responsive to determining the target area is not aligned with the user's visual focus alignment component 112 can activate robotic assembly 116. In some embodiments of the previous invention, alignment component 112 can activate robotic assembly 116 based on preset or stored user preferences. In various embodiments of the present invention, alignment component 116 can display a responsive prompt asking the user if robotic assembly 116 should be deployed and/or activated. In other embodiments of the present invention, alignment component 116 can issue a notification to the user announcing that robotic assembly is being activated and/or deployed, in which the issued notification has a predetermined amount of time for the user to cancel the activation and/or deployment of robotic assembly 116.

In step 312, alignment component 112 aligns the target area with the user's visual focus. In various embodiments of the present invention, assembly component 112 instructs and directs robotic assembly 116 on how to move (e.g., fold, unfold, twist, turn, rotate, flip, etc.) so the target area and the user's visual focus align. In various embodiments of the present invention, alignment component 112 instructs and directs robotic assembly 116 on how to align the target area with the user's visual focus based on the current user conditions, wherein the current user conditions are identified based on the collected user data, learned user preferences from the force-based feedback, user preferences, video feed from camera 118, one or more smart lens 140es, and/or sensor(s) 114.

Figure 4:
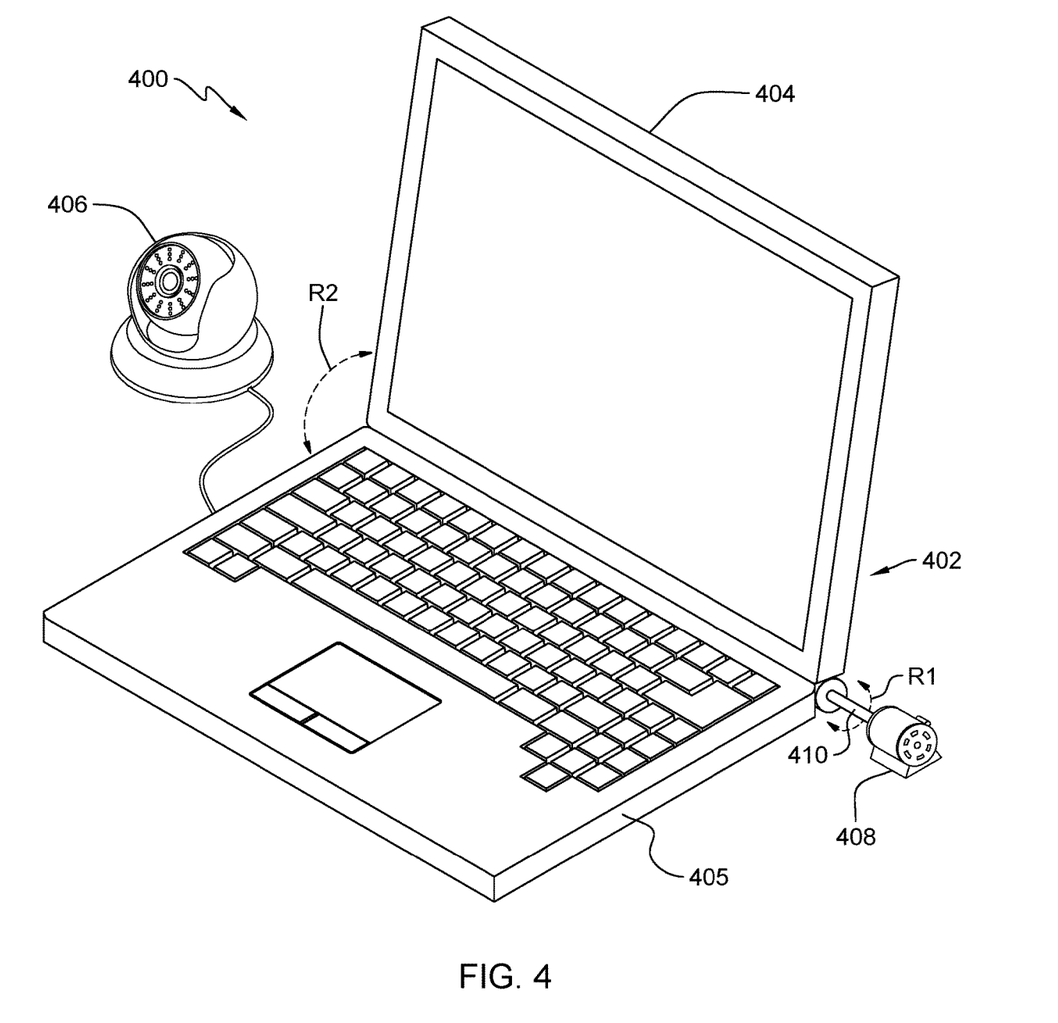
FIG. 4 is a perspective view of a second embodiment of a system according to the present invention.

FIG. 4 is a perspective view illustrating various portions of laptop computer system 400 in accordance with one embodiment of the present invention, including laptop computer sub-system 402; laptop display 404; laptop base 405; camera sub-system 406; display motor sub-system 408; and shaft 610. Display motor turns the shaft an angle "R1" causing the laptop display to rotate an angle R2 with respect to the laptop base.

Figure 5:
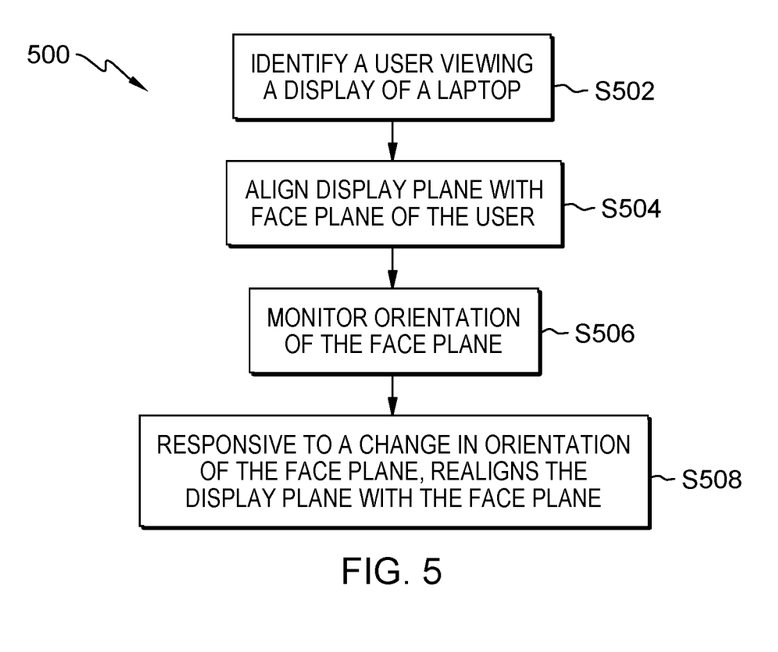
FIG. 5 is a flowchart showing a method performed, at least in part, by the second embodiment system.
Figure 6:
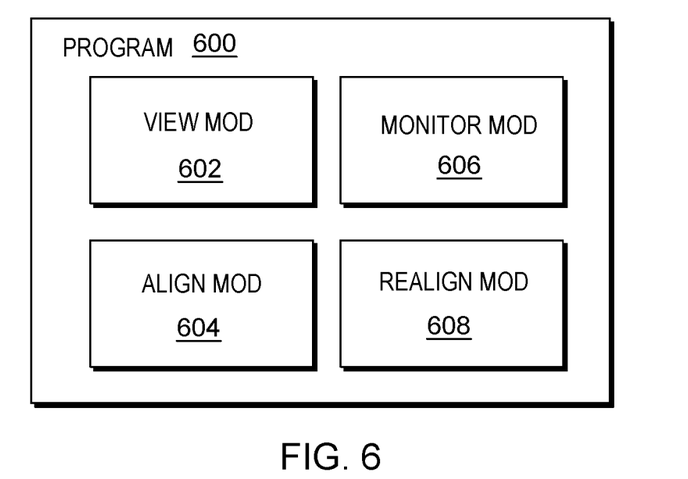
FIG. 6 is a schematic view of a machine logic (for example, software) portion of the second embodiment system.

FIG. 5 shows flowchart 500 depicting a method for operating laptop system 400 according to the present invention. FIG. 6 shows program 600 for performing at least some of the method steps of flowchart 500. This method and associated software will now be discussed, over the course of the following paragraphs, with extensive reference to FIG. 5 (for the method step blocks) and FIG. 6 (for the software blocks).

Processing begins with step S502, where view module ("mod") 602 identifies a user viewing a display of a laptop. In this example, view mod 602 identifies a user via camera system 406 (FIG. 4). Camera system 406 identifies a user according to proximity of the user to laptop display 404. When a user is within a pre-determined distance from the display, view mod 602 operates to determine that a user is present and initiate the alignment process according subsequent operations of flowchart 500. When view mod 602 determines that a user is present, some embodiments of the present invention operate to identify specifically who the user is, initiating the alignment process only for authorized users. In this example, user proximity is sufficient to "identify the user" and proceed. Alternatively, view mod 602 identifies a user only after receiving a notification to identify a user. In some embodiments of the present invention, the notification is received by voice command.

When a user is identified, various user attributes are determined including the head, the eyes, and the nose of the user for determining a face plane of the user. The face plane is an artificial plan oriented perpendicular to the direction of the face, the face plane being determined by the eyes and the nose of the user. Alternatively, other user attributes are applied to determine the direction that the face is looking or is turned. Other attributes may be the ears, the mouth, the cheeks, and the neck of the user. View mod may also identify characteristics of the proximate user including wearing of glasses, earphones, a necklace, and/or jewelry. When applied, the various attributes and characteristics support determination by the view mod that a user is viewing the display and where the face plane of the viewing user is located, wherein the viewing user is the user using laptop computer system 400.

Processing proceeds to step S504, where align mod 604 aligns a display plane with the face plane of the user. In this example, the display plane is associated with the physical surface of laptop display 404. Camera system 406 supports determination of the display plane. Alignment is performed by motor 408 to cause the display plane and the face plane to be parallel with each other. In operation, the face plane will not always be parallel with the display plane during use. The viewing user will likely look away occasionally or look at the keyboard of laptop base 405. Align mod 604 operates to freeze angle R2 when the face plane is oriented in such a way that the laptop display cannot be aligned with the face plane.

Processing proceeds to step S506, where monitor mod 606 monitors orientation of the face plane. During operation of the computer by the viewing user, movement of the user, including movement of the head, is likely to occur such that the display plane is no longer aligned with the face plane. Monitor mod 606 detects movement and determines the revised orientation of the face plane. In this example, each time the user moves, the face plane is recalculated and communicated to realign mod 608 for display adjustment.

Alternatively, monitor mod 606 periodically compares the orientation of the face plane with a new face plane corresponding to the actual orientation of the head. When a difference is detected that exceeds a pre-defined threshold difference, such as an angular difference of 10 degrees, processing proceeds to step S508. The period for evaluation may be based on passage of time or amount of usage of the laptop, whether duration of activity, beginning of new activity such as opening of an application, or amount of data transferred. Alternatively, monitor mod 606 operates when prompted by a notification, for example by voice command, user input to a GUI, or a pre-defined keystroke.

Processing proceeds to step S508, where realign mod 608, responsive to a change in the orientation of the face plane, realigns the display plane with the face plane. When monitor mod 606 communicates a change to realign mod 608, the display plane is moved by operation of motor 408. In this example, continuous monitoring is performed so communication of a change in face plane is communicated to realign mod 608 whenever the user moves. As discussed above, realign mod 608 may not always be able to move the laptop display to align with the new face plane. When such an event occurs, the laptop display remains at the previous orientation.

Figure 7A:
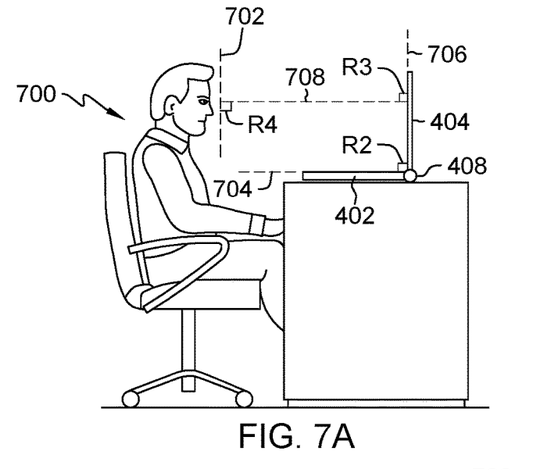
FIG. 7A is a perspective view of a first operation of the second embodiment system according to the present invention.
Figure 7B:
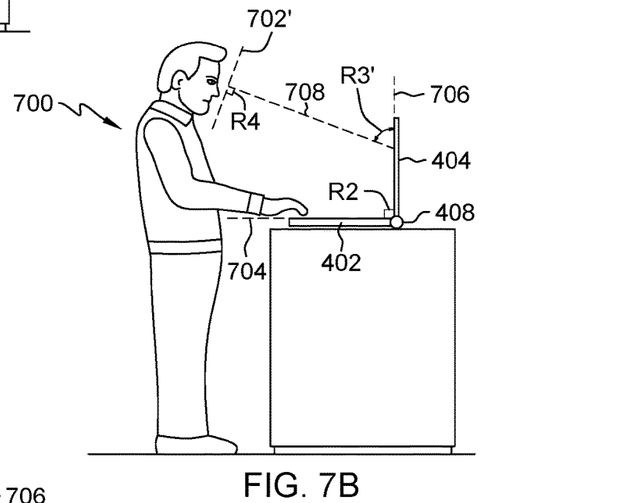
FIG. 7B is a perspective view of a second operation of the second embodiment system according to the present invention.
Figure 7C:
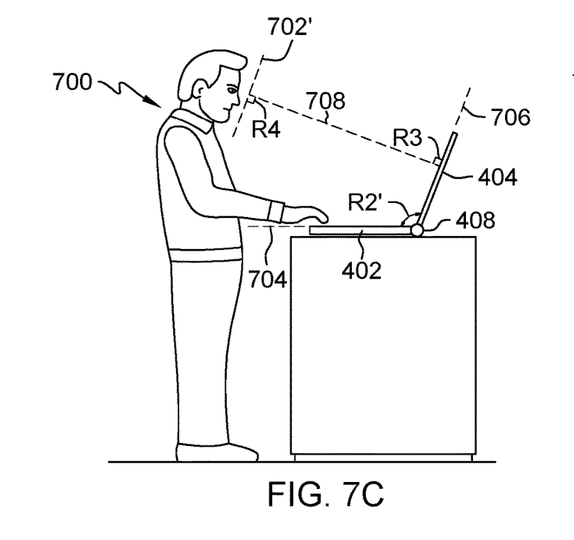
FIG. 7C is a perspective view of a third operation of the second embodiment system according to the present invention.

FIGS. 7A, 7B, and 7C illustrate specific exemplary operations of laptop system 400 with respect to an identified user, such as user 700. These FIGS. are intended to depict certain specific actions taken by program 600 when causing the laptop system to perform according to embodiments of the present invention.

Referring now to FIG. 7A, User 700 is seated while viewing laptop display 404. Camera sub-system 406 (FIG. 4) provides input to view mod 602 for determining face plane 702, display plane 706 and laptop base plane 704. In this illustration, align mod 608 has aligned the display plane with the face plane to be a parallel such that angles R4 (from face plane) and R3 (from display plane) are supplementary 90-degree angles along viewing axis 708. Further in this FIG., laptop display 404 and the laptop base 405 are at an angle R2 with respect to each other, the angle R2 is 90 degrees as shown.

Referring now to FIG. 7B, User 700 changes position from sitting to standing. In the standing position, monitor mod 606 determines via camera sub-system 406 that previous face plane 702 does not match current face plane 702'. In this example, the determination is based on detected movement during continuous monitoring. Alternatively, the current face plane is calculated when a change in position of the user is detected. The current face plane is determined to be above a threshold angle of difference from the previous face plane, so realignment of the display is needed. As shown in the illustration, angle R3' is not 90-degrees to viewing axis 708 (i.e., the user's visual focus is not aligned with the target area), as it generally should be according to this example embodiment of the present invention. As discussed above, alternatively monitor mod 606 is notified to recalculate the face plane or to otherwise communicate to realign mod 608 that a realignment is necessary. Notification may be communication by voice command.

Referring now to FIG. 7C, realign mod 608 causes the motor to turn an angle R2' such that angle R3' returns to original R3, 90-degrees to viewing axis 708 (i.e., the user's visual focus is realigned with the target area).

Figure 8:
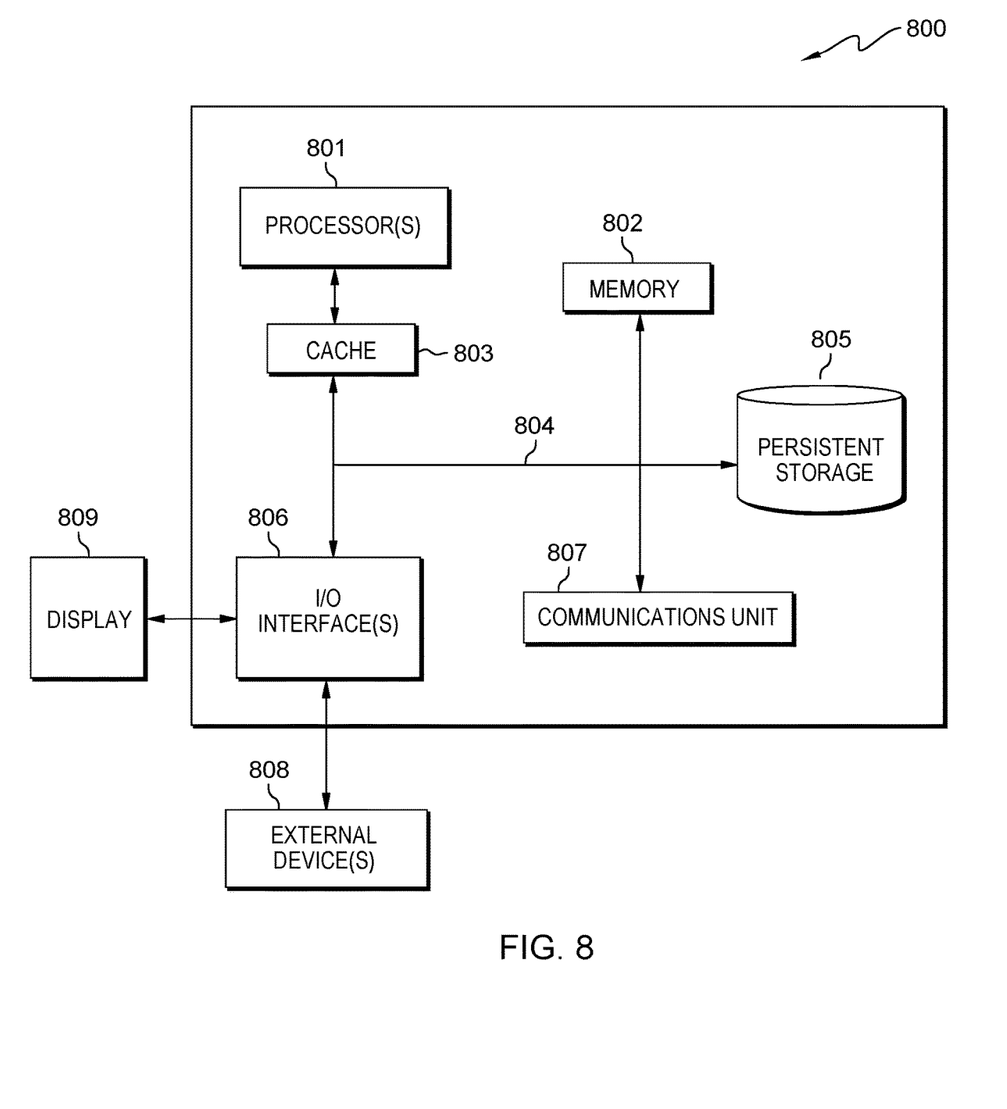
FIG. 8 depicts a block diagram of components of the computing device executing the intelligent mapping program within the distributed data processing environment of FIG. 1, in accordance with an embodiment of the present invention.

FIG. 8 depicts a block diagram of components of computing device 110 and/or server computer 120 within distributed data processing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

FIG. 8 depicts computer system 800, where computing device 110 represents an example of computer system 800 that includes alignment component 112. The computer system includes processors 801, cache 803, memory 802, persistent storage 805, communications unit 807, input/output (I/O) interface(s) 806, display 809, external device(s) 808 and communications fabric 804. Communications fabric 804 provides communications between cache 803, memory 802, persistent storage 805, communications unit 807, and input/output (I/O) interface(s) 806. Communications fabric 804 can be implemented with any architecture designed for passing data and/or control information between processors (such as microprocessors, communications, and network processors, etc.), system memory, peripheral devices, and any other hardware components within a system. For example, communications fabric 804 can be implemented with one or more buses or a crossbar switch.

Memory 802 and persistent storage 805 are computer readable storage media. In this embodiment, memory 802 includes random access memory (RAM). In general, memory 802 can include any suitable volatile or non-volatile computer readable storage media. Cache 803 is a fast memory that enhances the performance of processors 801 by holding recently accessed data, and data near recently accessed data, from memory 802.

Program instructions and data used to practice embodiments of the present invention can be stored in persistent storage 805 and in memory 802 for execution by one or more of the respective processors 801 via cache 803. In an embodiment, persistent storage 805 includes a magnetic hard disk drive. Alternatively, or in addition to a magnetic hard disk drive, persistent storage 805 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 805 can also be removable. For example, a removable hard drive can be used for persistent storage 805. Other examples include optical and magnetic disks, thumb drives, and smart cards that are inserted into a drive for transfer onto another computer readable storage medium that is also part of persistent storage 805.

Communications unit 807, in these examples, provides for communications with other data processing systems or devices. In these examples, communications unit 807 includes one or more network interface cards. Communications unit 807 can provide communications through the use of either or both physical and wireless communications links. Program instructions and data used to practice embodiments of the present invention can be downloaded to persistent storage 805 through communications unit 807.

I/O interface(s) 806 enables for input and output of data with other devices that can be connected to each computer system. For example, I/O interface 806 can provide a connection to external devices 808 such as a keyboard, keypad, a touch screen, and/or some other suitable input device. External devices 808 can also include portable computer readable storage media such as, for example, thumb drives, portable optical or magnetic disks, and memory cards. Software and data used to practice embodiments of the present invention can be stored on such portable computer readable storage media and can be loaded onto persistent storage 805 via I/O interface(s) 806. I/O interface(s) 806 also connect to display 809.

Display 809 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the FIGS. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically aligning a computing device's display area with a user's visual focus, the method comprising:
   analyzing a direction of a display area and a user's visual focus, wherein the display area comprises a target area;
   responsive to receiving one or more notifications or a voice command from a user, determining the target area is not aligned with the user's visual focus;
   activating a robotic assembly to align the target area with the user's visual focus;
   aligning the target area with the user's visual focus based on a user's current situation, wherein aligning causes the target area and a user's line of visual focus to overlap within a predetermined angular range; and
   issuing a notification to the user announcing that robotic assembly is being un-collapsed, wherein the issued notification has a predetermined amount of time for the user to cancel the un-collapsing of robotic assembly.

2. The computer-implemented method of claim 1, further comprising:
   determining the user's current situation, wherein determining the user's current situation comprises:
   analyzing video feed from a camera component;
   analyzing captured user data from one or more sensors; and
   identifying the user's current situation based on the analyzed video feed and the captured user data.

3. The computer-implemented method of claim 1, further comprising:
   receiving force-based feedback from the user while the robotic assembly un-collapses; and
   learning user preferences based on the received force-based feedback.

4. The computer-implemented method of claim 1, wherein a first end of the robotic assembly is electrically coupled to the display area and a second end of the robotic assembly is electrically coupled to a computing device and the robotic assembly collapses and un-collapses the display area with respect to the computing device based on the user's current situation, wherein the robotic assembly comprises 6 degrees of freedom.

5. The computer-implemented method of claim 4, further comprising:
   displaying a responsive prompt asking the user if the robotic assembly should be un-collapsed.

6. The computer-implemented method of claim 1, further comprising:
   confirming that the target area is aligned with the user's visual focus by communicating with one or more smart contact lenses worn by the user.

7. A computer program product for dynamically aligning a computing device's display area with a user's visual focus, the computer program product comprising:
   one or more computer readable storage devices and program instructions stored on the one or more computer readable storage devices, the stored program instructions comprising:
   program instructions to analyze a direction of a display area and a user's visual focus, wherein the display area comprises a target area;
   responsive to receiving one or more notifications or a voice command from a user, program instructions to determine the target area is not aligned with the user's visual focus;
   program instructions to activate a robotic assembly to align the target area with the user's visual focus;
   program instructions to align the target area with the user's visual focus based on a user's current situation, wherein aligning causes the target area and a user's line of visual focus to overlap within a predetermined angular range; and
   program instructions to issue a notification to the user announcing that robotic assembly is being un-collapsed, wherein the issued notification has a predetermined amount of time for the user to cancel the un-collapsing of robotic assembly.

8. The computer program product of claim 7, further comprising:
   program instructions to determine the user's current situation, wherein determining the user's current situation comprises:
   program instructions to analyze video feed from a camera component;
   program instructions to analyze captured user data from one or more sensors; and
   program instructions to identify the user's current situation based on the analyzed video feed and the captured user data.

9. The computer program product of claim 7, further comprising:
   program instructions to receive force-based feedback from the user while the robotic assembly un-collapses; and
   program instructions to learn user preferences based on the received force-based feedback.

10. The computer program product of claim 7, wherein a first end of the robotic assembly is electrically coupled to the display area and a second end of the robotic assembly is electrically coupled to a computing device and the robotic assembly collapses and un-collapses the display area with respect to the computing device based on the user's current situation, wherein the robotic assembly comprises 6 degrees of freedom.

11. The computer program product of claim 10, further comprising:
   program instructions to display a responsive prompt asking the user if the robotic assembly should be un-collapsed.

12. The computer program product of claim 7, further comprising:
   program instructions to confirm that the target area is aligned with the user's visual focus by communicating with one or more smart contact lenses worn by the user.

13. A computer system for dynamically aligning a computing device's display area with a user's visual focus, the computer system comprising:
  one or more computer processors;
  one or more computer readable storage devices;
  program instructions stored on the one or more computer readable storage devices for execution by at least one of the one or more computer processors, the stored program instructions comprising:
    program instructions to analyze a direction of a display area and a user's visual focus, wherein the display area comprises a target area;
    responsive to receiving one or more notifications or a voice command from a user, program instructions to determine the target area is not aligned with the user's visual focus;
    program instructions to activate a robotic assembly to align the target area with the user's visual focus;
    program instructions to align the target area with the user's visual focus based on a user's current situation, wherein aligning causes the target area and a user's line of visual focus to overlap within a predetermined angular range; and
    program instructions to issue a notification to the user announcing that robotic assembly is being un-collapsed, wherein the issued notification has a predetermined amount of time for the user to cancel the un-collapsing of robotic assembly.

14. The computer system of claim 13, further comprising: program instructions to determine the user's current situation, wherein determining the user's current situation comprises:
  program instructions to analyze video feed from a camera component;
  program instructions to analyze captured user data from one or more sensors; and
  program instructions to identify the user's current situation based on the analyzed video feed and the captured user data.

15. The computer system of claim 13, further comprising:
  program instructions to receive force-based feedback from the user while the robotic assembly un-collapses; and
  program instructions to learn user preferences based on the received force-based feedback.

16. The computer system of claim 13, wherein a first end of the robotic assembly is electrically coupled to the display area and a second end of the robotic assembly is electrically coupled to a computing device and the robotic assembly collapses and un-collapses the display area with respect to the computing device based on the user's current situation, wherein the robotic assembly comprises 6 degrees of freedom; and
  program instructions to display a responsive prompt asking the user if the robotic assembly should be un-collapsed.

17. The computer system of claim 13, further comprising:
  program instructions to confirm that the target area is aligned with the user's visual focus by communicating with one or more smart contact lenses worn by the user.

18. The computer-implemented method of claim 1, wherein aligning the target area with the user's visual focus based on a user's current situation further comprises: extending, rotating, or shaping the robotic assemblies until the axis of the display area is aligned with the user's line of visual focus or is only visible to the user.

19. The computer program product of claim 7, wherein aligning the target area with the user's visual focus based on a user's current situation further comprises: extending, rotating, or shaping the robotic assemblies until the axis of the display area is aligned with the user's line of visual focus or is only visible to the user.

20. The computer system of claim 13, wherein aligning the target area with the user's visual focus based on a user's current situation further comprises: extending, rotating, or shaping the robotic assemblies until the axis of the display area is aligned with the user's line of visual focus or is only visible to the user.

* * * * *